(12) United States Patent
Tonellato et al.

(10) Patent No.: US 12,228,213 B2
(45) Date of Patent: Feb. 18, 2025

(54) THERMAL MANAGEMENT VALVE

(71) Applicant: Dana Canada Corporation, Oakville (CA)

(72) Inventors: Silvio Tonellato, Hamilton (CA);
Benjamin Miethig, Hamilton (CA);
Michael Martin, Hamilton (CA)

(73) Assignee: DANA CANADA CORPORATION, Oakville (CA)

( * ) Notice: Subject to any disclaimer, the term of this patent is extended or adjusted under 35 U.S.C. 154(b) by 144 days.

(21) Appl. No.: 18/059,836

(22) Filed: Nov. 29, 2022

(65) Prior Publication Data
US 2023/0358324 A1 Nov. 9, 2023

Related U.S. Application Data

(60) Provisional application No. 63/364,406, filed on May 9, 2022.

(51) Int. Cl.
*F16K 11/085* (2006.01)
*F16K 31/04* (2006.01)

(52) U.S. Cl.
CPC ............ *F16K 11/085* (2013.01); *F16K 31/04* (2013.01)

(58) Field of Classification Search
CPC .................................. F16K 11/085; F16K 31/04
See application file for complete search history.

(56) References Cited

U.S. PATENT DOCUMENTS

| | | | | |
|---|---|---|---|---|
| 6,289,931 | B1 * | 9/2001 | Sisk | F25B 41/26 |
| | | | | 137/625.43 |
| 6,953,184 | B2 * | 10/2005 | Lanz | F16K 11/085 |
| | | | | 251/344 |
| 10,724,645 | B2 * | 7/2020 | Konaka | F16K 11/076 |
| 11,156,300 | B2 * | 10/2021 | Bunda | F16K 27/065 |
| 11,852,252 | B2 * | 12/2023 | Yeon | F16K 11/20 |

OTHER PUBLICATIONS

"Dana's e-Valves combine the best of fluid and electronic controls," Charged EVs Website, Avialbe Online at https://chargedevs.com/sponsored/danas-e-valves-combine-the-best-of-fluid-and-electronic-controls/, Feb. 11, 2022, 15 pages.

* cited by examiner

*Primary Examiner* — Eric Keasel
(74) *Attorney, Agent, or Firm* — McCoy Russell LLP (57) ABSTRACT

In one example, a proportioning valve, comprises a valve body, a first fitting coupled to the valve body, a second fitting coupled to the valve body, and a third fitting coupled to the valve body, where the second fitting and the third fitting each extend in parallel to the first fitting. In one example, an inner bore of the valve body is substantially cylindrical. In one example, the first fitting is an outlet fitting, the second fitting is a first inlet fitting, and the third fitting is a second inlet fitting. In another example, the first fitting is an inlet fitting, the second fitting is a first outlet fitting, and the third fitting is a second outlet fitting. In one example, the valve body includes a flow diverter positioned within the valve body.

8 Claims, 6 Drawing Sheets

THERMAL MANAGEMENT VALVE

CROSS REFERENCE TO RELATED APPLICATION

The present application claims priority to U.S. Provisional Application No. 63/364,406, entitled "THERMAL MANAGEMENT VALVE", and filed on May 9, 2022. The entire contents of the above-listed application are hereby incorporated by reference for all purposes.

TECHNICAL FIELD

The invention relates generally to a valve for controlling fluid flow in a thermal management system.

BACKGROUND AND SUMMARY

Automotive thermal management systems utilize fluid to transfer heat from one system to another. Traditionally, this has been achieved with a wax thermostatic element that directs flow based on the temperature of the working fluid. These types of systems, however, lack fine-tune control and are limited to temperature-based adjustments. As automotive systems become increasingly complex with the adoption of electric vehicles (EVs), this basic level of control is no longer acceptable for efficient operation. EVs do not create the same level of heat output as internal combustion engine vehicles; therefore, the usefulness of a wax element is more limited. Furthermore, more advanced electrical systems such as those found in electric vehicle systems utilize cooling in more granular locations within the motor, and can provide improved performance when delivered in a more controlled manner.

The inventors of the present application have recognized the above issues and present a valve, system, and method to at least partly address the issues. In one example, a proportioning valve includes a valve body, a first fitting coupled to the valve body, a second fitting coupled to the valve body, and a third fitting coupled to the valve body, where the second fitting and the third fitting each extend in parallel to the first fitting. In one example, the proportioning valve includes an inner cylindrical bore of the valve body that is substantially cylindrical. The first fitting may be an inlet fitting, and the second and third fittings may be outlet fittings, for example, or the first fitting may be an outlet fitting and the second and third fittings may be inlet fittings. By positioning the outlet fittings parallel to each other and the inlet fitting (or the inlet fittings parallel to each other and to the outlet fitting), a pressure drop across the valve may be reduced, packaging space may be reduced, and fluid flow proportioning may be more precise.

DETAILED DESCRIPTION

A three-way proportioning valve with three ports each coupled to a respective fitting that are parallel to one another is disclosed herein. A flow diverter sits between an inlet side and an outlet side of the valve. The flow diverter rotates in order to regulate flow through two of the fittings according to the flow requirements of the system. The valve uses an internal cylindrical core to regulate flow between the three fittings. In some embodiments, the side of the valve with the single fitting may be the inlet side, while the side of the valve with two fittings may be the outlet side. For example, the valve may include a first inlet fitting, a first outlet fitting, and a second outlet fitting. In other embodiments, the valve may be positioned in an opposite configuration where the inlet is the side with two fittings and the outlet is the side with one fitting. For example, the valve may include a first inlet fitting, a second inlet fitting, and a first outlet fitting. In some examples, the three-way valve may be injection-molded, glass-filled polypropylene, though other manufacturing methods may be used without departing from the scope of this disclosure.

The proportioning valve described herein gives the vehicle's thermal management system the ability to accurately direct a thermal management medium, such as a high-heat capacity cooling fluid, to the desired areas within the system, depending on the vehicle's operating conditions. By being able to direct cooling fluid within the motor, the motor is cooled more efficiently. Additionally, by being able to more effectively manage heat removal from the electric motor, the system is able to exclude the use of other costly and redundant parts. The proportioning valve disclosed herein may be installed in other fluid management systems without departing from the scope of this disclosure.

As mentioned above, the proportioning valve (which may also be referred to as a three-way valve) includes a side with two fittings (e.g., two outlet fittings) that are positioned parallel to each other and parallel to a fitting (e.g., an inlet fitting) on an opposite side of the valve. Arranging the fittings of the valves in parallel has multiple benefits. A first benefit is minimizing pressure drop as fluid travels through the valve. A second benefit is to reduce the packaging envelope required for the valve as different applications may present different physical packaging limitations. Another benefit is that by the fittings being parallel, the fittings (and the flow through the valve) may be able to run parallel to any pre-existing hoses present in the vehicle's motor system. A further benefit of the valve disclosed herein is to increase the surface area of the openings/ports on the side with the two fittings (e.g., the outlet side) when located tangentially to the outside of the cylindrical valve body. For example, the two outlets may be positioned tangential to the internal cylinder housing the flow diverter, which results in an elliptical-shaped opening for each outlet that has a greater area than circular openings formed when outlets are positioned normal to the internal cylinder. By increasing the cross-sectional surface area of the outlet openings, the amount of control over the fluid through the valve is more precise. This is achievable since rotations of the internal flow diverter reveal or conceal more or less of the outlet opening when compared to a fitting that enters normal to the cylinder face. In one example, a 15 mm fitting that enters a 75 mm diameter internal cylinder (e.g., the cylindrical valve body described below) will require an angle of 23° and 53° for normal and tangential entry, respectively, to block a flow passage. In other words, with the tangential positioning of the outlet fittings described herein, a larger amount of rotation of the flow diverter is required to fully block an opening than if the outlet fitting was positioned normal to the valve body. As such, the outlet can be partially blocked by smaller increments (e.g., one degree of rotation may block a smaller amount of the opening compared to if the fitting were positioned normal to the valve body), providing more precision over the control of the flow of fluid through the valve.

An axis system 199 is provided for comparison between views shown in FIG. 1-12. The reference axes 199 indicate a y-axis, an x-axis, and a z-axis. In one example, the y-axis may be parallel with a direction of gravity and the x-z plane may be parallel with a horizontal plane that a three-way valve 101 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Figure 1:
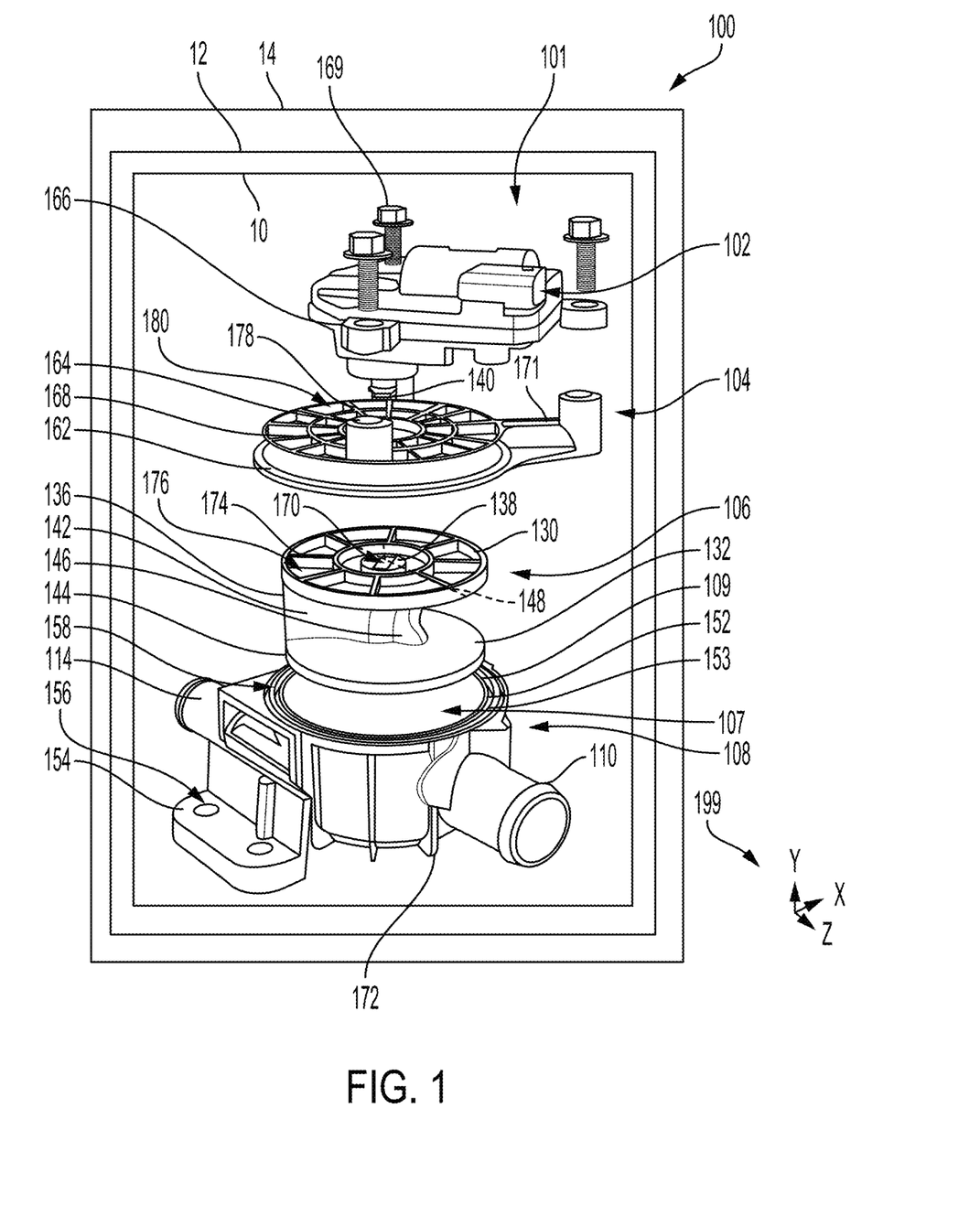
FIG. 1 is an exploded view of a three-way valve according to an embodiment of the present disclosure.

FIG. 1 is an exploded view 100 of the three-way valve 101. The three-way valve 101 may be positioned in a thermal management system in an electric vehicle. For example, the three-way valve 101 is shown positioned in a thermal management system 10 in an electric vehicle 14, shown schematically. In one example, the three-way valve 101 may control a flow of a liquid coolant, e.g., water, within a motor 12 interfacing with the thermal management system 10. In another example, the three-way valve 101 may control a flow of liquid coolant within electronics or battery modules interfacing with the thermal management system 10.

The exploded view 100 of the three-way valve 101 details a valve actuator 102, a valve body cover 104, a rotating flow diverter or flow diverter 106, and a valve enclosure 108. In one example, the flow diverter 106 is positioned within an inner bore 107 of a cylindrical valve body 109 of the valve enclosure 108. The flow diverter 106 may be rotated via the valve actuator 102 in order to proportion a flow of fluid entering the valve enclosure 108 via a first inlet fitting, herein inlet fitting 110, between two outlet fittings (a first outlet fitting 112 not shown in FIG. 1 and a second outlet fitting 114). In one example, the inner bore 107 of the cylindrical valve body 109 is substantially cylindrical. In one example, the cylindrical valve body 109 may be a valve body having a substantially cylindrical inner bore and variable outer geometric features depending on, for example, packaging parameters encountered for a given use. The flow diverter 106 includes a top portion 130, a bottom portion 132, and blocking portion 136 configured to selectively block the two outlet fittings.

The blocking portion 136 is sized and shaped to partially or fully block a selected one of the outlet fittings depending on the commanded position of the flow diverter 106. The blocking portion 136 includes a first wall 142 extending vertically between the top portion 130 and the bottom portion 132 and extending laterally from a perimeter 144 to a central core 146 of the flow diverter 106. A second wall (e.g., second wall 204 in FIG. 2) is similarly arranged opposite a first line of symmetry 148. The top portion 130 includes an actuator interface 138 including a slot 170 configured to accommodate an actuator shaft 140 of the valve actuator 102. For example, the slot 170 of the actuator interface 138 may be shaped to interlock (e.g., mate) with the actuator shaft 140. The valve actuator 102 may be configured to move the flow diverter 106 to various positions. When energized, the valve actuator 102 may rotate the actuator shaft 140, thereby rotating the flow diverter 106. While FIGS. 1-12 are described herein with respect to the valve being positioned with two outlet fittings and one inlet fitting, it is to be appreciated that the three-way valve 101 may be positioned in an opposite configuration whereby the two outlet fittings would instead be inlet fittings and the inlet fitting would be an outlet fitting.

The valve enclosure 108 includes a cover-facing rim. In one example, a rim 158 includes a pair of grooves 152 positioned on opposite sides of a ridge 153. The rim 158 makes face-sharing contact with an underside (see FIG. 3, 7, etc.) of a rim 162 of the valve body cover 104. In one example, the grooves 152 facilitate welding of the valve body cover 104 to the valve enclosure 108 during assembly for sealing the three-way valve 101. For example, the grooves 152 may be a flash trap for weld flow. In another example, an O-ring or gasket may provide a seal between the valve body cover 104 and the valve enclosure 108. For example, the seal may be positioned in one of the grooves 152.

The valve enclosure 108 may be formed with a plurality of ribs 172. The blocking portion 136 may be formed with ribs 174 and recesses 176. The recesses 176 may be interspersed between the ribs 174. Similarly, the valve body cover 104 may be formed with ribs 178 and recesses 180. In one example, the ribs and recesses reduce weight and increase durability of the components.

The valve enclosure 108 includes a fastening section 154 having a pair of mounting openings 156, allowing the three-way valve 101 to be attached to a desired component in the system in which it is deployed, (e.g., a vehicle cooling system). The valve body cover 104 includes a plurality of mounting openings 164 that align with a plurality of mounting openings 166 coupled to the valve actuator 102. For example, a pair of mounting openings may be positioned on the lid portion 168 and another mounting opening may be positioned on a tab portion 171 of the valve body cover 104. In one example, the mounting openings 164 and mounting openings 166 may be threaded for use with bolts 169 for fastening the valve actuator 102 to the valve body cover 104.

Figure 2:
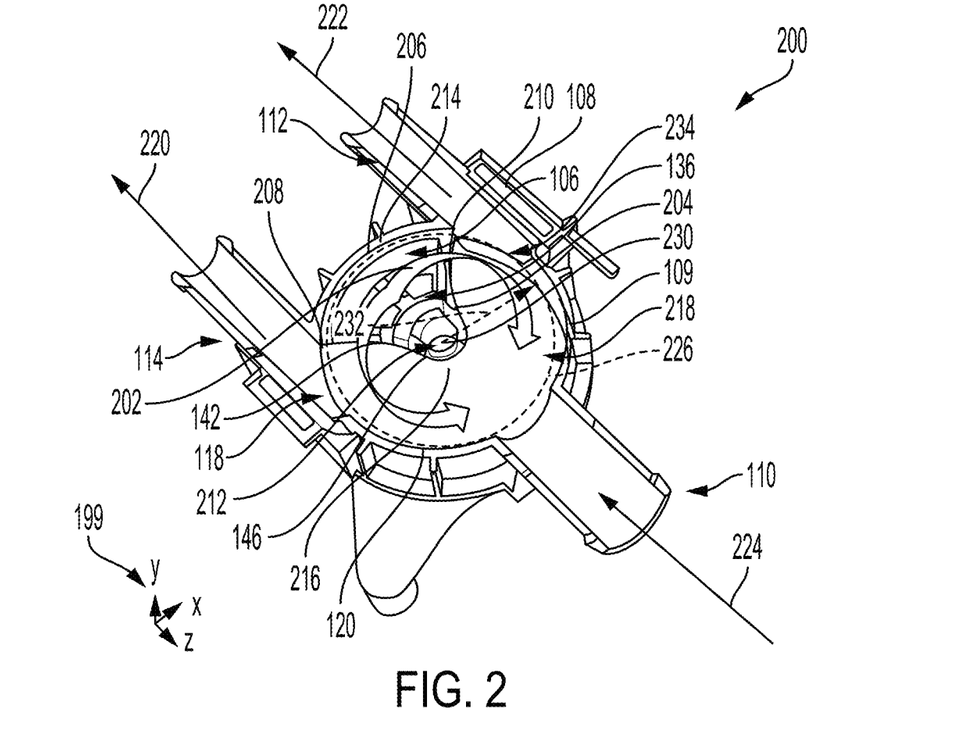
FIG. 2 is a first cross-sectional view of the three-way valve of FIG. 1.

FIG. 2 is a horizontal cross-sectional view 200 of the three-way valve 101. From this perspective, it can be seen that the rotating flow diverter spins in a direction as determined by the flow requirements, e.g., shown by double sided arrow 202.

As shown in FIG. 2, the outlet fittings each intersect an inner cylindrical surface 120 of the cylindrical valve body 109 at a position tangential to the cylindrical valve body 109. As a result, the first outlet fitting 112 and the second outlet fitting 114 have elliptical openings, such as elliptical opening 118. At elliptical openings, such as elliptical opening 118, the cross-sectional area of the outlet fitting, where the outlet fitting intersects with the cylindrical valve body 109, is larger than that of a similar port that is arranged perpendicular to the inner cylindrical surface 120. The flow diverter 106 has an axis of rotation 230 (shown as a filled circle) and a radius 232 extending to a virtual circular perimeter 226 (shown in dashing). The virtual circular perimeter 226 is described as being virtual because the circular perimeter spans the inlet and outlet openings. In one example, the flow diverter 106 may be rotated to position the blocking portion 136 to have both of the first outlet fitting 112 and the second outlet fitting 114 fully open. For another example, the flow diverter 106 may be rotated to position the blocking portion 136 to have one of either the first outlet fitting 112 or the second outlet fitting 114 partially blocked (throughout a range of possible positions to partially block the outlet by a smaller or larger amount depending on flow demands) while the other outlet remains open. For another example, the flow diverter 106 may be rotated to position the blocking portion 136 to have one outlet of either the first outlet fitting 112 or the second outlet fitting 114 fully blocked, while the other outlet remains unblocked. The flow diverter 106 is rotated to a commanded position by the valve actuator 102. In some examples, the valve actuator 102 includes a stepper motor. Once the flow diverter 106 is positioned in the commanded position, the valve actuator 102 can be de-energized, and will subsequently stay in its position.

In the view illustrated in FIG. 2, the shape of the blocking portion 136 includes the first wall 142, the central core 146, an arc wall 206, and a second wall 204. The arc wall 206 is positioned between the first wall 142 and the second wall 204. The central core 146 is curved and surrounds a center opening 212 of the blocking portion 136. The arc wall 206 includes an outer surface 214 in face sharing contact with the inner cylindrical surface 120 of the cylindrical valve body 109. The outer surface 214 is connected to an inner surface 216 that extends from a first terminating end 208 of the outer surface 214 to a second terminating end 210 of the outer surface 214 and encircles a center opening 212 of the blocking portion 136. In one example, the inner surface 216 is a continuous surface, e.g., without a hard edge, between the top portion 130 and the bottom portion 132, and the first terminating end 208 to the second terminating end 210.

In the position shown in FIG. 2, the blocking portion 136 of the flow diverter 106 is positioned intermediately between the first outlet fitting 112 and the second outlet fitting 114 and is not blocking either the first outlet fitting 112 or the second outlet fitting 114. For example, in the position shown in FIG. 2, the first terminating end 208 of the blocking portion 136 abuts the second outlet fitting 114 without obstructing the elliptical opening 118 and the second terminating end 210 of the blocking portion 136 abuts the first outlet fitting 112 without obstructing an elliptical opening 234. The flow diverter 106 forms an opening 218 bounded by the inner surface 216 of the blocking portion 136 extending between the top portion 130 and the bottom portion 132. As a result, fluid entering the three-way valve via the inlet 110 may flow into the opening 218 formed by the flow diverter 106 and may be proportioned equally between the first outlet fitting 112 and the second outlet fitting 114 when the flow diverter is positioned as shown in FIG. 2. Rotation of the flow diverter 106 in a clockwise direction moves the arc wall 206 of the blocking portion 136 to a partial or full coverage position in front of the first outlet fitting 112. Rotation of the flow diverter 106 in a counter-clockwise direction moves the arc wall 206 of blocking portion 136 to a partial or full coverage position in front of the second outlet fitting 114. In one example, the arc wall 206 of the blocking portion 136 is positioned to be in face-sharing contact with the inner cylindrical surface 120 in order to prevent leakage of fluid around the flow diverter 106. In another example, the arc wall 206 of the blocking portion 136 is positioned near to but not in actual contact with the inner cylindrical surface 120. Contact or non-contact between the flow diverter 106 and the inner cylindrical surface 120 may depend, for example, on materials used and flow parameters being considered and with respect to maintaining a balance between the ability to rotate the flow diverter 106 and control of fluid leakage around the flow diverter 106. In this way, the flow diverter 106 may be moved in a continuously adjustable manner within a range of positions to differentially proportion the flow between the two outlet fittings depending on the flow demands of the system in which the three-way valve 101 is installed.

In one example, the flow diverter 106 is continuously adjustable through a first range of positions, a second range of positions, and so on. For example, the valve actuator 102 may be controlled for adjusting the flow diverter 106 to any one of a first plurality of positions where the blocking portion 136 is positioned to partially or fully block the first outlet fitting 112. In one example, the second outlet fitting 114 may be fully open when the flow diverter 106 is in one of the first plurality of positions. As another example, the valve actuator 102 may be controlled for adjusting the flow diverter 106 to any one of a second plurality of positions where the blocking portion 136 is positioned to partially or fully cover the second outlet fitting 114. In one example, the first outlet fitting 112 may be fully open when the flow diverter 106 is in one of the second plurality of positions.

FIG. 2 further illustrates the parallel and tangential nature of the outlet fittings. For example, the first outlet fitting 112 and the second outlet fitting 114 each have a central longitudinal axis that extends approximately parallel to the corresponding arrows 220, 222 shown in FIG. 2, and the central longitudinal axis of each outlet fitting is parallel to the corresponding central longitudinal axis of the other outlet fitting. Likewise, the inlet fitting 110 has a central longitudinal axis that extends approximately parallel to the corresponding arrow 224, which is parallel to the central longitudinal axes of the outlet fittings. Each central longitudinal axis of the outlet fittings, e.g., arrows 220, 222, intersects the virtual circular perimeter 226 of the cylindrical valve body 109 at a position that is tangential to the virtual circular perimeter 226, while the central longitudinal axis of the inlet fitting, e.g., arrow 224, intersects the virtual circular perimeter 226 at a positon that is normal to the circular perimeter.

In this way, the proportioning valve may be controlled to flow fluid within a thermal management system in an electric vehicle, including between a motor and an inlet of the proportioning valve, and from the inlet of the proportioning valve to one or more of a first outlet and a second outlet of the proportioning valve via a flow diverter positioned in a circular valve body of the proportioning valve. Flowing the fluid may include flowing the fluid along an inlet flow axis (e.g., parallel to and/or aligned with the central longitudinal axis of the inlet) through the inlet and along a first outlet flow axis (e.g., parallel to and/or aligned with the central longitudinal axis of the first outlet fitting) through the first outlet and/or a second outlet flow axis (e.g., parallel to and/or aligned with the central longitudinal axis of the second outlet fitting) through the second outlet, the inlet flow axis parallel to each of the first outlet flow axis and the second outlet flow axis. In some examples, flowing the fluid includes flowing the fluid through the circular valve body and through both the second fitting and the third fitting, e.g., with the flow diverter in a first position intermediately between the first outlet and the second outlet. In some examples, flowing the fluid includes flowing the fluid through the circular valve body and through the first outlet with the flow diverter in a second position that partially or fully blocks the second outlet. In some examples, flowing the fluid includes flowing the fluid through the circular valve body and through the second outlet with the flow diverter in a third position that partially or fully blocks the first outlet. The flow diverter is continuously adjustable to any suitable position within a range of positions to maintain both outlets fully open (e.g., the position described above), partially block one of the outlets (or the other outlet), or fully block one of the outlets (or the other outlet). When the flow diverter is positioned to partially block an outlet, it is to be understood that the flow diverter can be positioned at any suitable or desired position based on system flow demands to block the outlet by a desired or commanded amount. For example, the flow diverter may block an outlet by an amount in the range of 0%-100%, such as 10%, 25%, 50%, 75%, etc. The granularity in the partial blockage may be based on the level of control provided by the actuator, and may be in increments of 1% or less, 5% or less, 10% or less, or 25% or less. For example, the flow diverter can be adjusted to block the outlet by 5%, then 10%, then 15%, or by 1%, then 2%, then 3%, etc.

Figure 3:
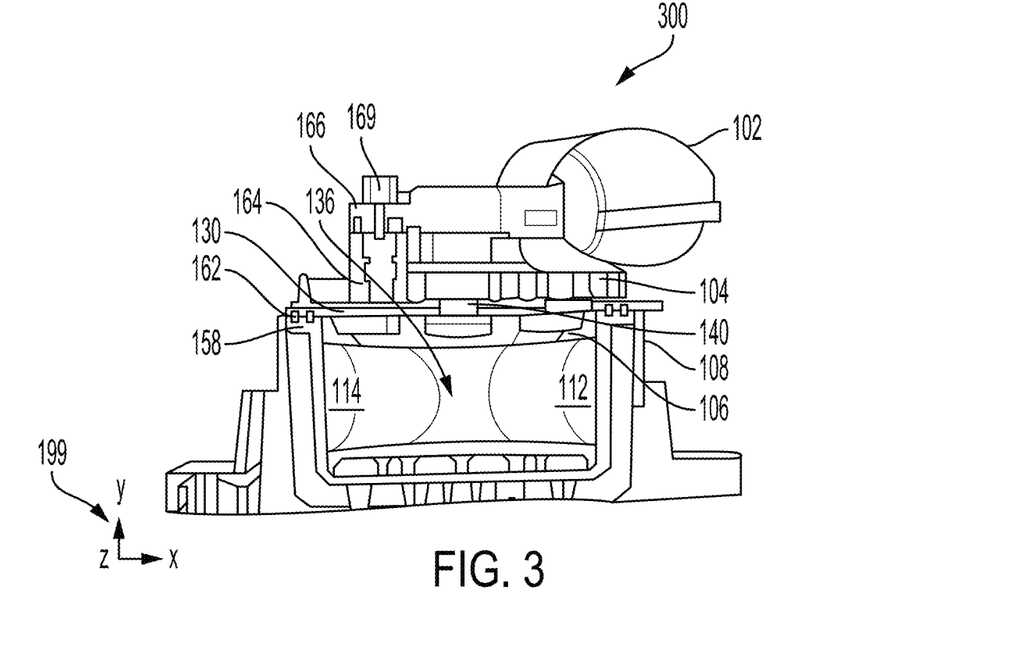
FIG. 3 is a second cross-sectional view of the three-way valve of FIG. 1.

FIG. 3 is a vertical cross-sectional view 300 of the three-way valve 101 in the same position as shown in FIG. 2. The valve actuator may be configured to move the flow diverter to various positions. The cross-sectional view illustrates an example where the valve actuator adjusted the flow diverter to the position where the blocking portion is positioned intermediately between the first outlet and the second outlet, where both the first outlet and the second outlet are fully open. In one example, the valve actuator 102 is electrically controlled (e.g., activated) by a controller of the vehicle system, e.g., thermal management system 10 in FIG. 1. In the example, the blocking portion 136 of the flow diverter 106 is positioned intermediately between the first outlet fitting 112 and the second outlet fitting 114. As appreciated from FIG. 3, in this position, both outlet fittings are open. The rotating flow diverter leverages the same principle as a v-port ball valve in order to provide additional proportional control to the valve system. By having a larger surface area on the outlet fitting, the amount of proportional control over the valve system is increased.

Further, the actuator shaft 140 is shown extending from the valve actuator 102, through the valve body cover 104, and intersecting the top portion 130 of the flow diverter 106. The view further shows the rim 158 of the cylindrical valve body 109 in face-sharing contact with the rim 162 of the valve body cover 104. The valve actuator 102 is joined to the valve body cover 104 via the bolt 169 threaded through the mounting opening 166 and aligning mounting opening 164.

Figure 4:
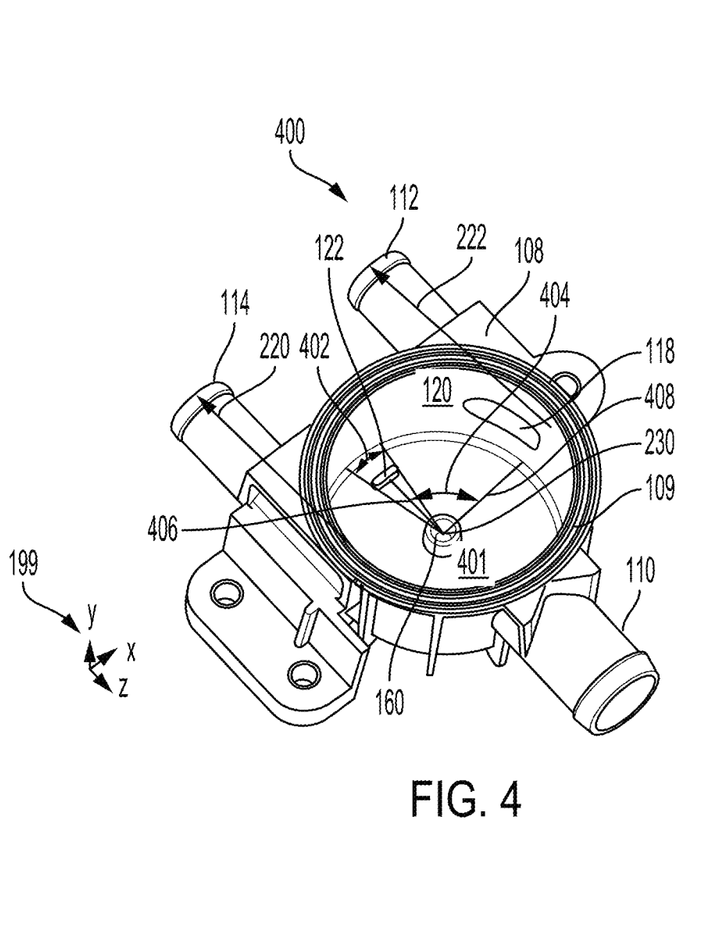
FIG. 4 is a top perspective view of a valve enclosure of the three-way valve of FIG. 1.
Figure 5:
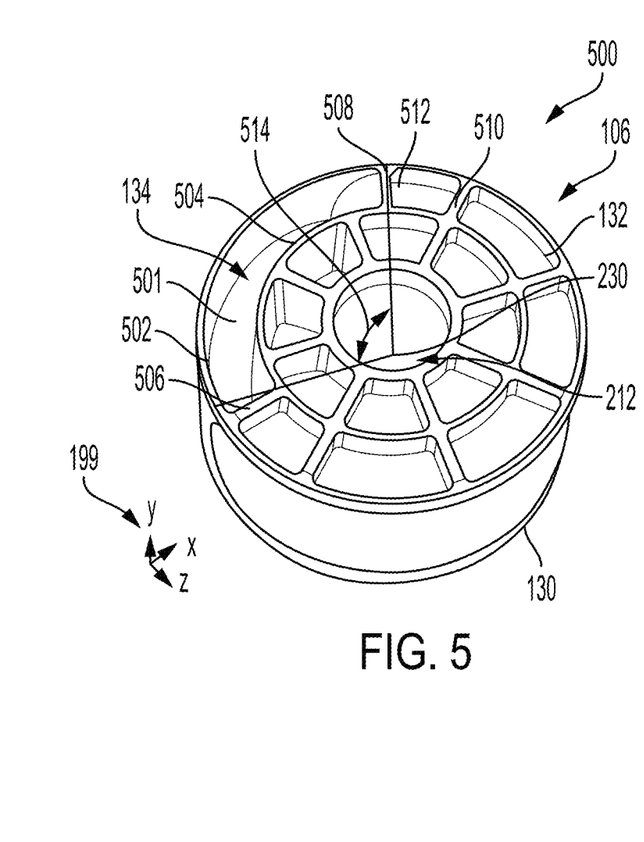
FIG. 5 is a bottom view of a flow diverter of the three-way valve of FIG. 1.

FIG. 4 and FIG. 5 together illustrate a hard stop feature for preventing over-rotation of the flow diverter. In one example, the hard stop feature mechanically restricts rotation of the flow diverter 106 to a desired range. FIG. 4 is top perspective view 400 of the valve enclosure 108 and shows a built-in hard stop tab or tab 122 manufactured into the housing, configured to interact with the flow diverter 106 as the flow diverter rotates during use. FIG. 5 is a bottom view 500 of the flow diverter 106 and shows a corresponding hard stop feature: a tab cavity 134 that complements the tab 122.

As shown in FIG. 4, the valve enclosure 108 includes a bottom surface 401 that includes the tab 122. In one example, the tab 122 is a bar shaped protrusion, having a length greater than a width and a height. The tab 122 protrudes from the bottom surface 401 at a position intermediately between the first outlet fitting 112 and the second outlet fitting 114. In one example, the tab 122 may be positioned nearer to the inner cylindrical surface 120 of the enclosure than to the hollow cylindrical body 160 onto which the rotating flow diverter sits. In one example, the tab 122 may be arranged at a first angle 402 with respect to the axis of rotation 230. In one example, the first angle 402 may be 20°±1°. A radius 406 crosses a midpoint of the tab 122. A radius 408 is perpendicular to the central longitudinal axis (shown as arrow 222) of the first outlet fitting 112. The radius 406 may be arranged at a second angle 404 from the radius 408 with respect to the axis of rotation 230. In one example, the second angle 404 may be 90°±0.2°. The tab 122 may be similarly arranged with respect to the central longitudinal axis (shown as arrow 220) of the second outlet fitting 114. The tab 122 can prevent the valve from ever reaching a condition where both outlet ports are covered, or can prevent one or both outlet fittings from being fully closed.

As shown in FIG. 5, the tab 122 complements the tab cavity 134 on the bottom portion 132 of the flow diverter 106. In one example, the tab cavity 134 comprises a void defined by a cavity surface 501 and an opening on the bottom portion 132 of the flow diverter 106. The cavity surface 501 extends from a first cavity wall 502 to a second cavity wall 504 and from a first stop wall 506 to a second stop wall 508. Similar to the top portion 130, the bottom portion 132 of the flow diverter 106 may include a plurality of ribs 510 and a plurality of recesses 512. In one example, the first stop wall 506, the second stop wall 508, and the second cavity wall 504 may be examples of ribs 510. The first stop wall 506 and the second stop wall 508 may be arranged at an angle 514 with respect to the axis of rotation 230. Interaction between the tab 122 and the tab cavity 134 ensures there is not over-rotation of the flow diverter 106. For example, rotation of the flow diverter 106 may be stopped by the tab 122 making face sharing contact with the first stop wall 506 or the second stop wall 508 of the tab cavity 134. In one example, the flow diverter may rotate within a range of approximately 120°, e.g., the angle 514. In one example, a fixed range may reduce buildup of pressure within the system and ensures continued operation of the valve.

In some examples, the hard stop feature may be used to calibrate the limits of the actuator that rotates the valve diverter. Such an example may allow for use of a stock actuator in the valve system. For example, valves that utilize different angles of rotation from the flow diverter 106 to control the flow may rely on a software calibration to refine the usable range of the actuator. In turn, this allows for finer motor control over a useful range of rotation. In some examples, a conventional actuator familiar to one skilled in the art may be used on this valve system. Further, to accommodate different hard stop ranges for different flow demands and systems, the tab can remain in the same location on the valve body and the flow diverter may be modified (e.g., size/position of the cavity adjusted) to adapt this feature on different valve designs.

The center opening 212 on the bottom portion of the flow diverter 106 complements the hollow cylindrical body 160. When coupled in the three-way valve system, the center opening 212 of the flow diverter 106 is positioned over the hollow cylindrical body 160. The hollow cylindrical body 160 acts as a fixed-point or a central axis allowing the rotating flow diverter to spin thereabout.

Figure 6:
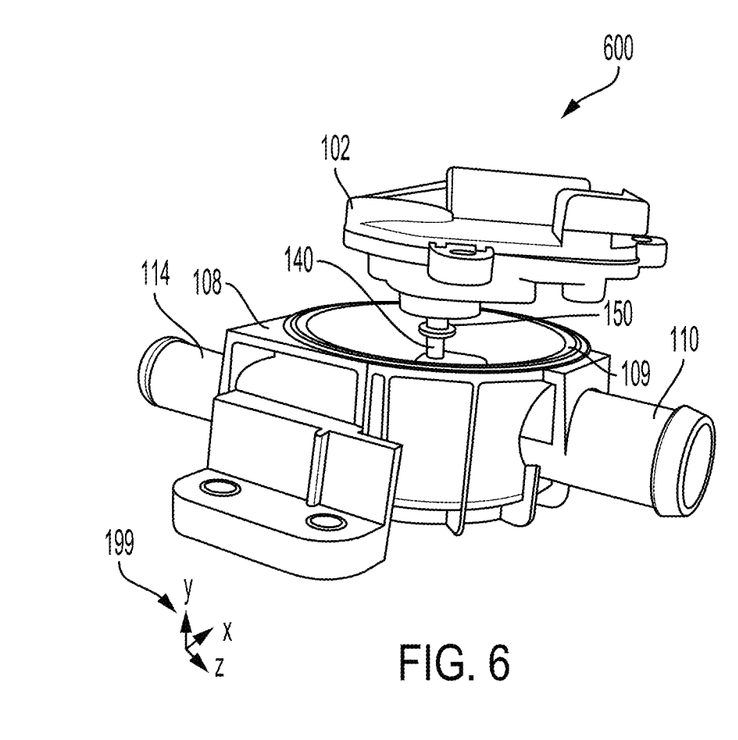
FIG. 6 is a side view of the valve enclosure and a valve actuator of the three-way valve of FIG. 1.
Figure 7:
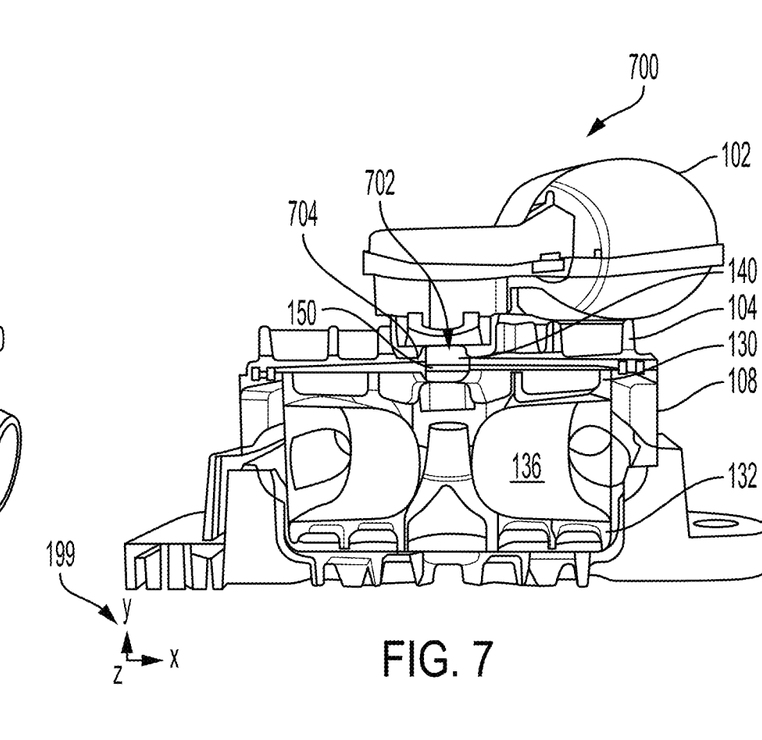
FIG. 7 is a third cross-sectional view of the three-way valve of FIG. 1.

FIGS. 6 and 7 offer varying perspectives on a sealing member found within the rotating flow diverter. The sealing member may be an O-ring, such as an O-ring 150. FIG. 6 shows a side view 600 of the valve enclosure 108 and valve actuator 102. FIG. 7 shows a cross-sectional view 700 of the three-way valve 101.

As shown in both FIGS. 6 and 7, an O-ring 150 is positioned on the actuator shaft 140 and in a central bore 702 of the valve body cover 104. When the three-way valve is assembled (e.g., as shown in FIG. 7), the O-ring 150 is positioned to provide a seal between the central bore 702 of the valve body cover 104 and the actuator shaft 140. The O-ring 150 acts as a sealable partition between the inside and outside of the fluid-carrying system. Such a seal allows for both positive pressure as well as vacuum pressure, under varying conditions. In some embodiments, the seal is installed after the valve cover is coupled to the valve enclosure. Draft angles 704 of the central bore 702 of the valve body cover 104 and the rigid attachment of the valve actuator 102 to the valve body cover 104 allow the O-ring 150 to be installed and may reduce time-consuming part positioning. In the event that a customer's actuator or seal breaks, rather than having to replace the entire valve, the actuator or seal may be repaired without removing the valve from the system in which it is installed. This significantly reduces the costs of labor if this type of component is to be replaced. In some embodiments, the valve is constructed using a sandwich-style method whereby a bolt or bolts, join two hemispheres of the valve together, though other suitable construction methods are possible without departing from the scope of this disclosure.

Figure 8:
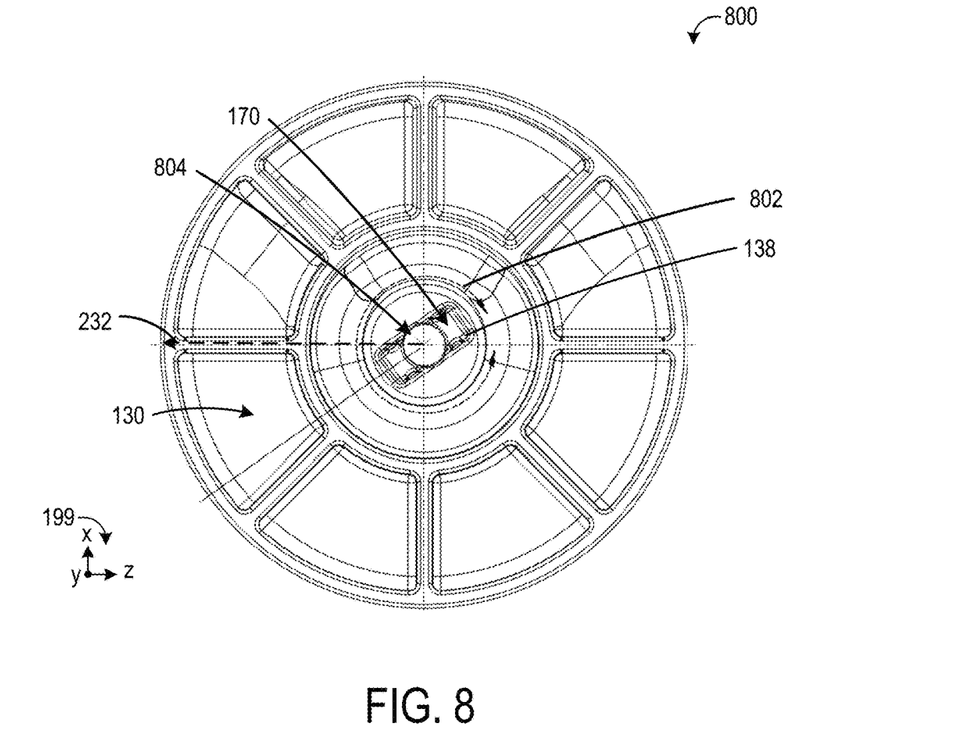
FIG. 8 shows a top view of the flow diverter of the three-way valve of FIG. 1.
Figure 9:
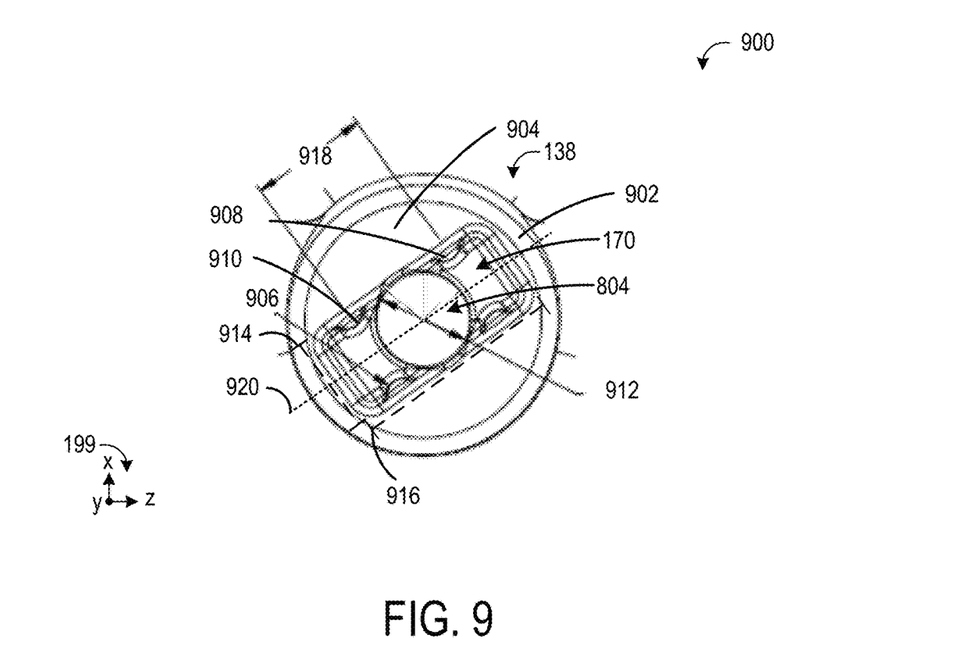
FIG. 9 shows a top detail view of the flow diverter of the three-way valve of FIG. 1.
Figure 10:
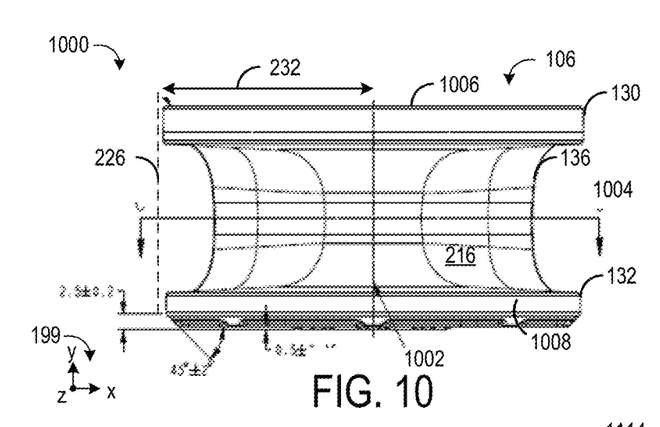
FIG. 10 shows a side view of the flow diverter of the three-way valve of FIG. 1.
Figure 11:
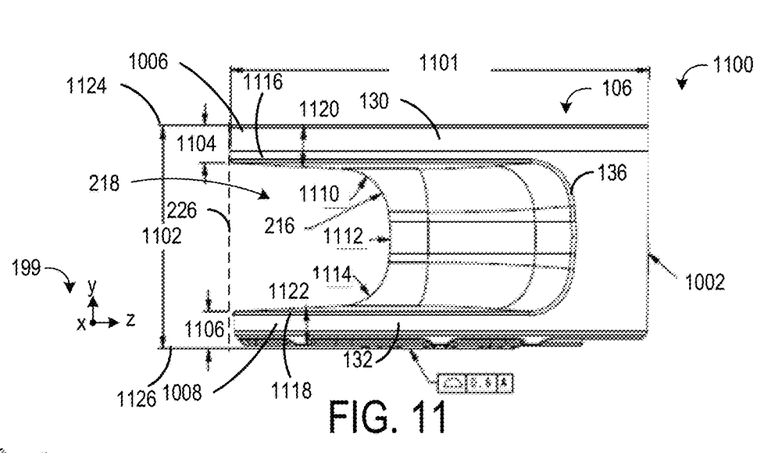
FIG. 11 shows another view of the flow diverter of the three-way valve of FIG. 1.
Figure 12:
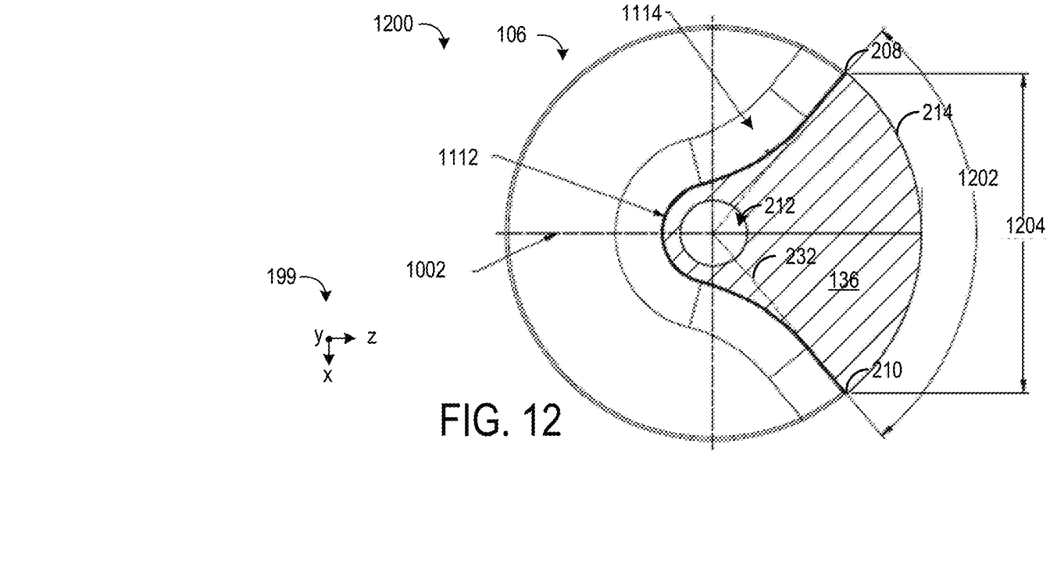
FIG. 12 shows a horizontal cross-sectional view of the flow diverter of the three-way valve of FIG. 1.

FIGS. 8-12 show additional views of the flow diverter 106. FIG. 8 is a top view 800, FIG. 9 is a top detail view 900 of the actuator interface 138, FIG. 10 is a front view 1000, FIG. 11 is a detail side view 1100, and FIG. 12 is a horizontal cross-sectional view 1200 of the flow diverter 106.

As shown in FIG. 8, the flow diverter 106 includes actuator interface 138. The radius 232 of the flow diverter 106 is shown for reference. The actuator interface 138 is an approximately bar-shaped recess, e.g., slot 170, having a central bore 804. The actuator interface 138 is positioned in a central region 802 of the top portion 130. The central region 802 is shown in FIG. 9.

As shown in FIG. 9, a cylindrical lip 902 surrounds the actuator interface 138. The actuator interface 138 is formed by a bar-shaped recess, e.g., the slot 170, in a planar surface 904. In one example, the slot 170 may have a length 916 greater than a width 914. A central bore 804 is positioned in the slot 170. In one example, the slot 170 and the actuator shaft 140 interlock (see FIG. 1, FIG. 7, etc.). In one example, the central bore 804 has a diameter 912 that may be receive a portion of the actuator shaft having similar dimension. Further, the slot 170 has rib feature, such as crush rib features 906. When assembled, these features create an interference fit between the actuator shaft 140 and the flow diverter 106, which prevents hysteresis in the flow diverter position when being rotated by the actuator. In one example, the crush rib features 906 may be positioned to create pressure on opposing sides of the actuator shaft 140. For example, a first crush rib 908 and a second crush rib 910 may be positioned a dimension 918 apart. A second pair of crush rib features may positioned across a horizontal line of symmetry 920. The small crush-rib features can also be assembled using less force and without special tools that may otherwise be typical for other interference-type fits.

FIG. 10 shows a first center plane 1002 and a second center plane 1004 of the flow diverter 106. Above the second center plane 1004, the top portion 130 of the flow diverter 106 includes a top sidewall 1006. Below the second center plane 1004, the bottom portion 132 includes a bottom sidewall 1008. In one example, when coupled in the system, the top sidewall 1006 and the bottom sidewall 1008 make face sharing contact with the inner cylindrical surface 120 of the valve enclosure 108. In another example, the top sidewall 1006 and the bottom sidewall 1008 are positioned close to but not touching the inner cylindrical surface 120 of the valve enclosure 108. The radius 232 of the flow diverter 106 is shown extending from the first center plane 1002 to the virtual circular perimeter 226.

FIG. 11 shows a detail side view 1100 of the flow diverter 106. Particularly, the side view shows a profile including the top portion 130 and the top sidewall 1006, the bottom portion 132 and bottom sidewall 1008, the blocking portion 136, and the inner surface 216. A diameter 1101 that may be twice the radius 232 (e.g., in FIG. 10) and the first center plane 1002 are included for reference.

The flow diverter 106 includes a first dimension 1102 extending from a top surface 1124 of the top portion 130 to a bottom surface 1126 of the bottom portion 132. The top sidewall 1006 has a second dimension 1104 extending between the top surface 1124 and an upper plane 1116 of top portion 130. The bottom sidewall 1008 has a third dimension 1106 extending between the bottom surface 1126 and a lower plane 1118 of the bottom portion 132.

In one example, the inner surface 216 is a curved surface extending between the upper plane 1116 and the lower plane 1118. The inner surface 216 may be oriented at a first angle 1120 with respect to the top surface 1124 from the virtual circular perimeter 226 to a first curved section 1110. Similarly, the inner surface 216 may be oriented at a second angle 1122 with respect to the bottom surface 1126 from the virtual circular perimeter 226 to a second curved section 1114. The inner surface includes a straight section 1112 interposed between the first curved section 1110 and the second curved section 1114. The inner surface 216 is a first boundary of the opening 218. The other boundary of the opening 218 is the inner cylindrical surface 120 of the cylindrical valve body 109.

The horizontal cross-sectional view 1200 shown in FIG. 12 bisects the flow diverter 106 through the second center plane 1004 illustrated in FIG. 10. As shown in FIG. 12, the blocking portion 136 includes the outer surface 214 that is configured to be in face-sharing contact with the inner cylindrical surface 120 of the cylindrical valve body 109. The outer surface 214 is connected to the inner surface 216 that extends from the first terminating end 208 of the outer surface 214 to the second terminating end 210 of the outer surface 214. The bisection through the straight section 1112 of the inner surface reveals the second curved section 1114. The inner surface 216 encircles the center opening 212 of the blocking portion 136. The inner surface 216 and outer surface 214 create a fan shape that diverts fluid flow around the blocking portion 136, though other shapes are possible without departing from the scope of this disclosure. In one example, the center opening 212 fits over the hollow cylindrical body 160 shown in FIG. 4.

In one example, the first terminating end 208 and the second terminating end 210 of the outer surface 214 are oriented at an angle 1202 with respect to the axis of rotation 230. In one example, the angle 1202 may be 100°±1°. In one example, the first terminating end 208 and the second terminating end 210 are arranged at a straight-line distance 1204.

In this way, by allowing cooling fluid to be selectively routed to desired areas using a single interconnected system, the systems and methods for the proportioning valve disclosed herein provide greater thermal management control.

The technical effect of the proportioning valve is increased vehicle performance and reduced redundant components.

FIGS. 1-12 show example configurations drawn to scale with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, the term "approximately" is construed to mean plus or minus five percent of the range unless otherwise specified and the term "substantially cylindrical" means that the elements are sufficiently cylindrical to be considered cylindrical to one of ordinary skilled in the art without being perfectly cylindrical.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and engines (e.g., internal combustion engines and hydrogen engines). The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a proportioning valve, having:
   a cylindrical valve body having a cylindrical surface;
   a first fitting coupled to the cylindrical valve body;
   a second fitting coupled to the cylindrical valve body; and
   a third fitting coupled to the cylindrical valve body, wherein the second fitting and the third fitting each intersect the cylindrical surface of the cylindrical valve body at a position tangential to the cylindrical surface of the cylindrical valve body to form a second opening and a third opening, respectively, and the first fitting intersects the cylindrical surface of the cylindrical valve body at a positon normal to the cylindrical surface of the cylindrical valve body to form a first opening, wherein the first opening has a circular shape and the second opening and the third opening each have an elliptical shape; and
a thermal management system of an electric vehicle, the proportioning valve positioned in the thermal management system.

2. The system of claim 1, wherein the first fitting is an outlet fitting, the second fitting is a first inlet fitting, and the third fitting is a second inlet fitting.

3. The system of claim 1, wherein the first fitting is an inlet fitting, the second fitting is a first outlet fitting, and the third fitting is a second outlet fitting.

4. The system of claim 1, further comprising a flow diverter positioned within the cylindrical valve body and a valve actuator configured to rotate the flow diverter.

5. The system of claim 4, wherein the flow diverter includes a blocking portion configured to selectively block the second fitting and/or the third fitting.

6. The system of claim 4, wherein the flow diverter has crush rib features at an interface between the flow diverter and a shaft of the valve actuator.

7. The proportioning valve of claim 4, further comprising a hard stop feature on the cylindrical valve body and a corresponding hard stop feature on the flow diverter.

8. The proportioning valve of claim 1, further comprising an O-ring positioned in a central bore of a valve cover of the proportioning valve.

* * * * *